United States Patent [19]

Haddox

[11] Patent Number: 4,633,707

[45] Date of Patent: Jan. 6, 1987

[54] METHOD AND APPARATUS FOR MEASURING ENGINE COMPRESSION RATIO, CLEARANCE VOLUME AND RELATED CYLINDER PARAMETERS

[75] Inventor: Mark L. Haddox, Ann Arbor, Mich.

[73] Assignee: Jodon Engineering Associates, Inc., Ann Arbor, Mich.

[21] Appl. No.: 645,857

[22] Filed: Aug. 31, 1984

Related U.S. Application Data

[63] Continuation-in-part of Ser. No. 416,852, Sep. 13, 1982, Pat. No. 4,505,152.

[51] Int. Cl.$^4$ ............................................ G01M 15/00
[52] U.S. Cl. ........................................ 73/47; 73/115; 73/117.3; 73/119 R
[58] Field of Search ...................... 73/115, 117.3, 116, 73/117.2, 119 R, 47, 49.7

[56] References Cited

U.S. PATENT DOCUMENTS

| | | |
|---|---|---|
| 2,202,220 | 5/1940 | Miller . |
| 2,427,370 | 9/1947 | Schweitzer . |
| 2,735,296 | 2/1956 | Traver . |
| 2,800,014 | 7/1957 | Welch et al. . |
| 3,964,301 | 6/1976 | Hanson et al. . |
| 4,036,049 | 7/1977 | Hanson . |
| 4,094,190 | 6/1978 | Jindrick ................................ 73/115 |
| 4,325,128 | 4/1982 | Abnett et al. . |
| 4,331,029 | 5/1982 | Wilson . |

OTHER PUBLICATIONS

Eberle, M. K. et al., An evaluation of . . . Rotary Engines, SAE Paper No. 730117, Jan. 1973, pp. 453–460.
Taylor, The Internal-Combustion Engine in Theory and Practice, M.I.T. Press, Vol. I (2nd Ed., 1966) pp. 26–27 and 216–217, and vol. II (1968) pp. 104–105 and 156–157.
Brown, "Methods for Evaluating Requirements and Errors in Cylinder Pressure Measurement," *SAE Paper No.* 67008 (1967).
Weinert, "Pneumatic and Sonic Measurement of Combustion-Chamber Volume", *SAE Transactions*, vol. 64, pp. 50–58 (1956).
Lancaster et al, "Measurement and Analysis of Engine Pressure Data", *SAE Paper No.* 750026 (1975).
Randall, K. W. et al., A Cylinder Pressure Sensor for Spark Advance Control and Knock Detection, SAE Paper No. 790,139 (1979).

*Primary Examiner*—Jerry W. Myracle
*Attorney, Agent, or Firm*—Barnes, Kisselle, Raisch, Choate, Whittemore & Hulbert

[57] ABSTRACT

A method and apparatus for measuring compression ratio and/or clearance volume in an internal combustion engine cylinder wherein the crankshaft angle associated with piston top dead center position is obtained and cylinder pressure is measured at a number of incrementally spaced piston positions. Changes in cylinder volume between the incrementally spaced piston positions are determined from nominal engine design parameters. These multiple pressure and volume figures are then employed in a programmed microprocessor to determine the constants $\gamma$ and k in the polytropic equation for relating cylinder pressure to volume $PV^\gamma = k$. Clearance volume $V_{TDC}$ is determined using the constants $\gamma$ and k, and measured pressure at TDC or incremental volume figures. Compression ratio is determined by the fraction $(V_{DP}+V_{TDC})/V_{TDC}$, where $V_{DP}$ is total piston displacement volume obtained from nominal engine design parameters. The invention is also implemented to determine cylinder leakage during the compression stroke, angles of operation of the intake and exhaust valves, effective compression ratio where the intake valve does not close at BDC, and/or cylinder intake pressure.

26 Claims, 7 Drawing Figures

METHOD AND APPARATUS FOR MEASURING ENGINE COMPRESSION RATIO, CLEARANCE VOLUME AND RELATED CYLINDER PARAMETERS

This application is a continuation-in-part of application Ser. No. 416,852 filed Sept. 13, 1982, now U.S. Pat. No. 4,505,152.

The present invention is directed to measuring and testing of internal combustion engine parameters, and more particularly to a method and apparatus for measuring clearance volume at piston top dead center, cylinder compression ratio and/or related cylinder parameters in an internal combustion engine.

BACKGROUND OF THE INVENTION

Engine compression ratio in an internal combustion engine has long been recognized as an important control parameter for obtaining optimum and consistent engine performance. Knowledge and control of compression ratio is important, for example, in controlling engine "knock", in controlling exhaust emissions and in achieving desired mileage performance. Hence, the ability accurately to determine compression ratio during the manufacturing process is of increasing interest and importance.

Engine compression ratio may be expressed by the fraction $(V_{DP}+V_{TDC})/V_{TDC}$, where $V_{DP}$ is total displacement volume of the piston within the cylinder and $V_{TDC}$ is cylinder clearance volume or head space at piston top dead center (TDC). Even if the intake valve closes after piston bottom dead center, the above definition is often used for analytical purposes. Piston displacement volume or $V_{DP}$ may be accurately obtained or determined from the mechanical design parameters and tolerances of engine component manufacture. However, clearance volume at TDC cannot be so obtained with desired accuracy, and the art has yet to propose a method for rapidly measuring $V_{TDC}$ in an assembled engine with the necessary and desired accuracy.

Other engine parameters, such as the amount of cylinder leakage as the piston travels in the compression stroke toward TDC, actual angle of intake and exhaust valve operation relative to TDC, and effective intake pressure are also of interest, the last being of particular interest in connection with supercharged engines.

OBJECTS AND SUMMARY OF THE INVENTION

A general object of the present invention, therefore, is to provide a method for accurately measuring compression ratio within the cylinder of an internal combustion engine, and to provide an apparatus for performing such method.

Another and more specific object of the invention is to provide a method and apparatus for accurately measuring clearance volume within the cylinder of an assembled engine.

A further object of the invention is to provide a method and apparatus for rapidly measuring cylinder compression ratio and/or clearance volume in real time with sufficient speed and accuracy to accommodate use on a mass production engine assembly line, and which avoids any need for interpretation by an operator.

Yet another object of the invention is to provide a method and apparatus for measuring cylinder compression ratio and/or clearance volume which may be used on either gasoline or diesel engines.

A further object of the invention is to provide a method and apparatus which accomplishes the foregoing and which employs the information so measured to identify further engine test parameters such as the amount of cylinder leakage, the angle of intake valve closing and/or exhaust valve opening, effective compression ratio and/or effective intake pressure.

Yet a further object of the invention is to provide a method and apparatus which is adapted to accomplish the foregoing in a production environment or a laboratory environment, which may be employed for testing engine components or assembled engines, and/or which may be employed in an on-vehicle engine control system.

Another object of the invention is to provide a method and apparatus of the described character for accurately measuring selected thermodynamic parameters within the cylinder of an internal combustion engine.

Briefly stated, the method and apparatus of the present invention employ the known relationship between cylinder pressure and volume expressed by the polytropic equation:

$$PV^{\gamma}=k \qquad (1)$$

where P is pressure, V is volume, and $\gamma$ and k are constants for a given cylinder for given ambient conditions. The method of the invention contemplates accurate location of piston TDC position in units of crankshaft angle of rotation and measurement of cylinder pressure P at a number of piston positions which are spaced from each other in terms of crankshaft angle by known increments. Piston displacement volume between successive rotation increments may be accurately predetermined from engine design parameters, as previously indicated. The constants $\gamma$ and k for the test cylinder are then accurately and rapidly determined in real time from the several pressure measurements and predetermined incremental displacement volumes by mathematical solution of multiple equations for multiple unknowns or by employing an iterative graphic analysis.

In accordance with one implementation of the invention, clearance volume $V_{TDC}$ is then determined from equation (1) using measured pressure at TDC, and compression ratio is determined using the known total piston displacement volume $V_{DP}$. A second implementation of the invention contemplates determination of clearance volume $V_{TDC}$ without measuring cylinder pressure at TDC, which improves measurement accuracy by avoiding problems associated with cylinder leakage and gas dynamics near TDC. Indeed, the latter implementation can then be employed to quantify leakage in the test cylinder by predicting theoretical pressure at TDC per equation (1) and then comparing such predicted pressure with actual measured pressure at TDC.

The information obtained per the foregoing may then be employed in accordance with further aspects of the invention to determine such engine parameters as effective closure angle of the intake valve, effective opening angle of the exhaust valve, effective compression ratio when the intake valve does not close precisely at piston bottom dead center (BDC), and effective cylinder intake pressure. The latter two determinations are of particular interest in connection with supercharged engines.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The preferred embodiments of the method and apparatus of the present invention employ techniques and principles which are disclosed in detail in the U.S. Pat. No. to Scott E. Wilson No. 4,331,029. This patent is assigned to the assignee hereof, and the entirety thereof is incorporated herein by reference.

Figure 1:
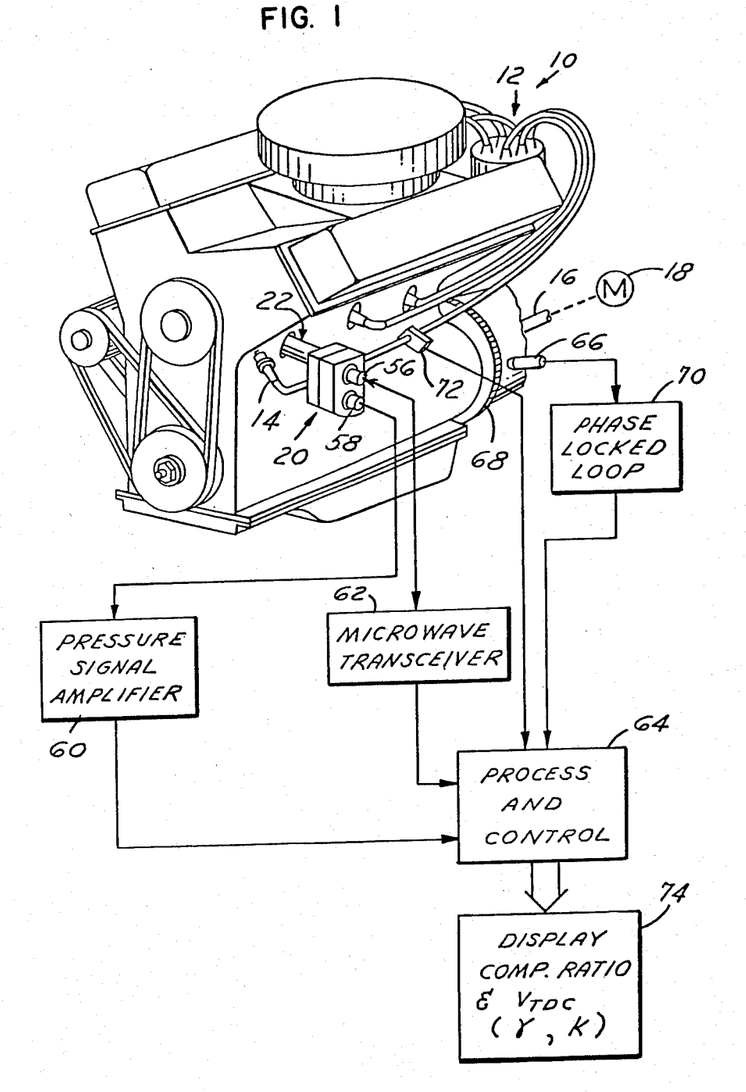
FIG. 1 is a functional block diagram of a presently preferred embodiment of the apparatus in accordance with the invention coupled to an internal combustion engine.

FIG. 1 illustrates a conventional V-6 gasoline internal combustion engine 10 which includes a distributor 12 coupled to a plurality of spark plugs 14. For measuring clearance volume and compression ratio in accordance with a preferred embodiment of the invention, engine 10 is mounted on a "cold test" stand (not shown) and has its crankshaft 16 coupled to a motor 18 so that the engine may be cycled without actual fuel ignition. One of the spark plugs 14 is removed from the cylinder block and a microwave/pressure probe 20 in accordance with the invention is threaded into the engine cylinder bore in place thereof.

Figures 2, 3:
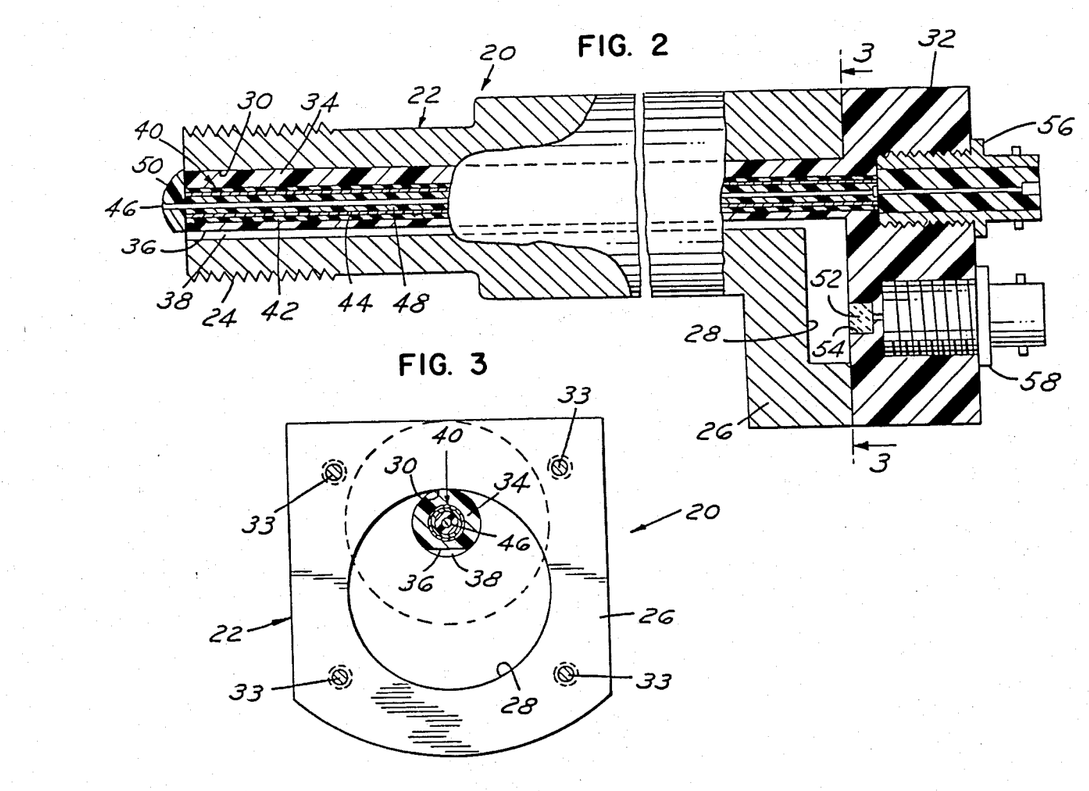
FIG. 2 is an elevational fragmentary partially sectioned view on an enlarged scale as compared with FIG. 1 of a microwave/pressure probe in accordance with the invention.
FIG. 3 is a sectional view taken along the line 3—3 in FIG. 2.

Referring to FIGS. 2 and 3, probe 20 includes an outer metal sleeve 22 threaded at one end 24 so as to be adapted for reception into the vacated spark plug opening. A lip 26 radiates from the opposing end of sleeve 24 and has a circular recess 28 formed in the axial face thereof tangentially contiguous with and overlapping the central bore 30 of sleeve 22. A block 32 of insulating material such as plastic is mounted by the screws 33 on sleeve 22 overlying lip 26. Block 32 has an integral sleeve 34 telescopically received and extending through axial bore 30. The radially facing edge of sleeve 34 adjacent to lip 26 is flattened as at 36 in FIG. 3 so as to cooperate with the opposing wall of bore 30 to form a part-cylindrical axial slot 38. Slot 38 extends from the tip of sleeve 22 at end 24 to recess 28 and is of sufficient cross sectional area to transmit pressure variations accurately.

A length of coaxial cable 40 is snugly received within the central bore of sleeve 34. Cable 40 includes an outer insulation sheath 42 surrounding an outer conductor 44. A central or inner conductor 46 extends through cable 40 and is separated from outer conductor 44 by the insulation layer 48. Insulation layers 42,48 and outer conductor 44 terminate in assembly flush with the coplanar ends of sleeves 32,34 while the coax cable conductor 46 protrudes or extends therefrom. A protective cap 50 of Teflon or the like covers the tip of conductor 46 but does not cover the end of slot 38. A pressure transducer 52 such as a piezoelectric crystal is mounted within a pocket 54 in block 32 in open communication with recess 28. A pair of coax connectors 56,58 are mounted on block 32 and are respectively connected to coax cable 40 and pressure transducer 52. Thus, with probe 20 received into the cylinder block in place of a spark plug 14 (FIG. 1), pressure transducer 52 communicates with the cylinder interior through pocket 54, recess 28 and slot 38 to provide at connector 58 an electrical signal indicative of pressure variations within the test cylinder as the piston reciprocates therein.

Returning to FIG. 1, connector 58 on probe 20 is connected through a suitable pressure signal amplifier 60 to the process and control electronics 64. Likewise, probe connector 56 is connected through the microwave transceiver electronics 62 to process and control electronics 64. To monitor or track rotation of crankshaft 16, a magnetic pick-up 66 is positioned adjacent the starting ring gear 68 which is coupled to the engine crankshaft. Pick-up 66 is connected to a phase locked loop 70 to provide a periodic series of pulsed signals to electronics 64 at predetermined increments of crankshaft rotation, such as on the order of every 0.1°. A suitable phase locked loop 70 is illustrated in FIG. 8 of the referenced Wilson patent. The referenced patent also discloses an optical transducer which may be removably coupled to the engine crankshaft to monitor crankshaft rotation in place of pick-up 66. Process and control electronics 64, which may comprise a suitably programmed conventional microprocessor, receives an input from an inductive pick-up 72 operatively coupled to the cable of the spark plug 14 replaced by probe 20. This input is used to distinguish the compression/power stroke of the associated piston from the exhaust/intake stroke. Process and control electronics 64 also includes conventional analog-to-digital conversion and sample-and-hold circuitry responsive to amplifier 60 and transceiver 62. Process and control electronics 64 provide an output to a suitable display device 74 for providing a numerical display of compression ratio C/R and clearance volume $V_{TDC}$, and of the cylinder constants Y and k if desired.

Operation of the invention will be described in greater detail in connection with the flow diagram of FIG. 4 and the graphic illustrations of FIGS. 5 and 6. More specifically, FIG. 5 includes a first graph 80 which illustrates the relationship of cylinder volume V to crankshaft angle $\theta$ in the region around TDC, and a second graph 82 which illustrates the relationship of cylinder pressure P to crankshaft angle $\theta$ in the same region. It will be noted that cylinder volume V describes a symmetrical curve about a minimum clearance volume $V_{TDC}$ at the crankshaft angle $\theta_{TDC}$ associated with the piston top dead center position. Cylinder pressure P is likewise illustrated as a symmetrical curve about a peak at $\theta_{TDC}$, although for some engines it is believed that the dynamics of gas behavior in a motored engine may place maximum cylinder pressure slightly ahead of the piston top dead center angle. Operation of the invention is not affected by location of peak pressure. Also, these curves may have a slight, predictable asymmetry due to engine design parameters such as wrist pin offset. The illustrations of FIG. 5, which are not to scale, cover an angular range during the compression power stroke of the piston in which all valves are closed. It is presently preferred to perform the method of the invention while the engine is cold motored by an external source 18 because changes in cylinder pressure (with all valves closed) may be related directly to changes in volume due to piston motion, as will be described.

With the spark plug 14 removed and the probe 20 inserted in place thereof, the engine is cold motored by the motor 18 and microwave signals are injected by transceiver electronics 62 and probe 20 into the cylinder volume or bore. As the piston reciprocates within the cylinder, the microwave signals exhibit a plurality of resonance peaks which are generally symmetrical around piston TDC. Process and control electronics is responsive to the microwave resonance signals directed thereto by transceiver electronics 62, and to the crankshaft rotation signals obtained from phase locked loop 70, for accurately identifying the crankshaft angle associated with piston TDC, i.e. $\theta_{TDC}$. The process for locating $\theta_{TDC}$ is described in greater detail in the referenced Wilson patent, and reference is made thereto for a more detailed description of the preferred method for locating piston TDC in practice of the present invention. Although microwave-range radiation is specifically disclosed in Wilson and is presently preferred, it is envisioned that radiation in other frequency ranges, such as X-rays or ultrasonics, may be used in appropriate circumstances while applying the Wilson technique for identifying $\theta_{TDC}$ from the radiation return signal.

As a next step, three angles $\theta_1$, $\theta_2$ and $\theta_3$ are selected at spaced intervals with respect to $\theta_{TDC}$. In the illustration of FIG. 5, angles $\theta_1$, $\theta_2$, $\theta_3$ and $\theta_{TDC}$ are at equally spaced intervals during the piston compression stroke. Cylinder pressure as indicated by probe 20 and pressure signal amplifier 60 is then measured at each angle $\theta_1$, $\theta_2$, $\theta_3$ and $\theta_{TDC}$ to obtain corresponding pressure signals. $P_1$, $P_2$, $P_3$ and $P_{TDC}$ which are stored in memory. It is presently considered preferable, although not necessary, to measure pressure on several successive compression strokes, and to utilize average pressures for further computations. As previously indicated, the changes in cylinder volume during the intervals between the selected angles $\theta_1$, $\theta_2$ and $\theta_3$ may be accurately determined as a function of engine mechanical design parameters. These incremental displacement volumes $V_{1-2}$ and $V_{2-3}$ may be either precalculated for predetermined values of $\theta_1$, $\theta_2$ and $\theta_3$ and stored in memory for later retrieval, or may be rapidly calculated in real time within process and control electronics 64 from design parameter operator inputs (not shown).

The constants $\gamma$ and k for the specific cylinder under test and the volume $V_1$ at crankshaft angle $\theta_1$ are then identified. Two techniques for finding $\Gamma$, k and $V_1$ are presently preferred. In the first technique, initial volume V1 and the constants Y and k are obtained by solution of the following three equations for at least two (Y and k) and preferably three unknowns:

$$P_1 V_1^\gamma = k \quad (2)$$

$$P_2 (V_1 - V_{1-2})^\gamma = k \quad (3)$$

$$P_3 (V_1 - V_{1-2} - V_{2-3})^\gamma = k \quad (4)$$

These equations are readily solved using conventional microprocessor techniques for $V_1$, $\gamma$ and k from measured pressures $P_1$, $P_2$ and $P_3$ and from incremental displacement volumes V1-2 and V2-3 determined on the basis of engine design parameters.

Alternatively, and in accordance with the second technique the constant $\gamma$ and the volume $V_1$ are found using an iterative "graphic" technique. First, equations (2)-(4) above are rearranged as follows:

$$\frac{P_1}{P_2} = \left[ \frac{V_1 - V_{1-2}}{V_1} \right]^\gamma \quad (5)$$

$$\frac{P_1}{P_3} = \left[ \frac{V_1 - V_{1-2} - V_{2-3}}{V_1} \right]^\gamma \quad (6)$$

$$\frac{P_2}{P_3} = \left[ \frac{V_1 - V_{1-2} - V_{2-3}}{V_1 - V_{1-2}} \right]^\gamma \quad (7)$$

Knowing the approximate or nominal value of $V_1$ (and $\gamma$) from the mechanical design, progressively varying values of $V_1$ (or $\gamma$) around nominal are substituted into equations (5)-(7), again using the measured pressures $P_1$, $P_2$, $P_3$ and the computed or precomputed incremental displacement volumes $V_{1-2}$ and $V_{2-3}$.

Solutions of these three equations for $\gamma$ for various values of $V_1$ (or for $V_1$ for various values of $\gamma$) yield the three curves 84, 86 and 88 illustrated in FIG..6. These three curves intersect at a point 90 which corresponds to the actual volume $V_1$ and the actual constant Y associated with the test cylinder. With $\gamma$, $P_1$ and $V_1$ in hand, the constant k is given by the equation:

$$k = P_1 V_1^\gamma \quad (8)$$

It will be appreciated that the iterative "graphic" technique may be readily performed using conventional microprocessor techniques without resorting to a manual "graphic" solution. Likewise, the point 90 of intersection may be found using only two of the three equations (5), (6) and (7). However, the use of three equations is preferred for enhanced accuracy over the full range of tolerances in engine design and the reliability tolerances of cylinder pressure measurement. That is, it may be expected under actual operating conditions that the three lines 84, 86, 88 do not intersect at a single point. Use of a third graph line helps to identify an "average" intersection point 90 with greater accuracy. Returning to FIG. 4, with the constants k and $\gamma$ identified and the pressure $P_{TDC}$ at piston top dead center measured per the above, the clearance volume $V_{TDC}$ at piston top dead center may be obtained per the equation:

$$V_{TDC} = \left[ \frac{k}{P_{TDC}} \right]^{\frac{1}{\gamma}} \quad (9)$$

Compression ratio C/R may then be obtained per the equation:

$$C/R = \frac{V_{TDC} + V_{DP}}{V_{TDC}} \quad (10)$$

Figure 4:
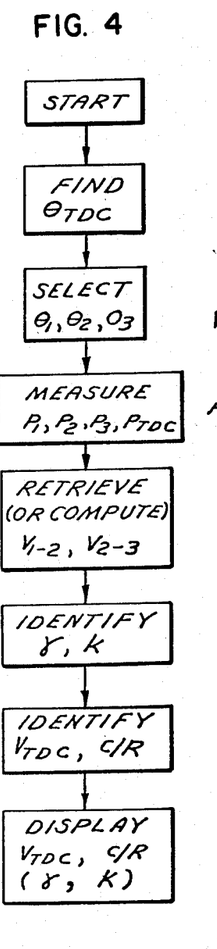
FIG. 4 is a flow chart illustrating operation of the invention.

As a final step in the process of FIG. 4, clearance volume $V_{TDC}$ and compression ratio C/R may be displayed to the test system operator. Likewise, in analytical or research applications for example, other parameters such as $\gamma$ and k for the engine and cylinder under test may be displayed if desired.

Figure 5:
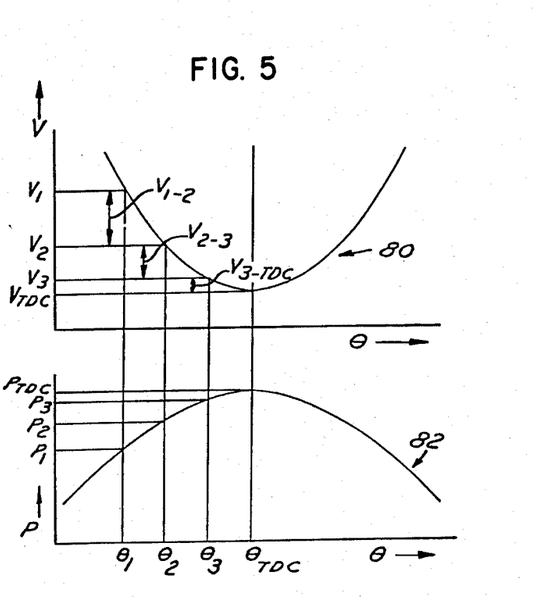
FIGS. 5–7 are graphic illustrations (not to scale) useful in understanding operation of the invention.
Figure 6:
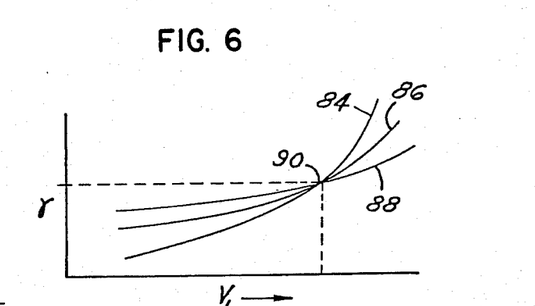

One potentially useful modification to the embodiments and techniques of the invention hereinabove discussed involves substitution of $V_{TDC}$ for $V_1$ as the arbitrarily selected starting volume, which would eliminate both the extra computation step of equation (9) and the necessity of measuring pressure $P_1$ at angle $\theta_1$. Thus, equations (2)–(4) may take the form:

$$P_{TDC}V_{TDC}^\gamma = k \quad (12)$$

$$P_3(V_{TDC}+V_{3\text{-}TDC})^\gamma = k \quad (12)$$

$$P_2(V_{TDC}+V_{3\text{-}TDC}+V_{2\text{-}3}) \quad (13)$$

where $P_2$, $P_3$ and $P_{TDC}$ are (average) pressures measured at $\theta_2$, $\theta_3$ and $\theta_{TDC}$ in FIG. 5, and $V_{3\text{-}TDC}$ and $V_{2\text{-}3}$ are incremental displacement volumes calculated or precalculated as previously described. Note that these equations may be directly solved for $V_{TDC}$, as well as for $\gamma$ and $k$. The iterative "graphic" technique of equations (5)–(7) and FIG. 6 may likewise be modified by substituting $V_{TDC}$ for $V_1$.

Another modification of potential interest involves measurement of total displacement volume $V_{DP}$ rather than, or in addition to, calculation or precalculation thereof as previously described. In this modification, assuming that all valves are closed at piston bottom dead center, total displacement volume is measured as a function of the equation:

$$V_{DP} = V_{BDC} - V_{TDC} \quad (14)$$

where $V_{BDC}$ is cylinder volume at piston bottom dead center. To obtain $V_{BDC}$, the crankshaft angle associated with piston BDC is first obtained. In theory, this angle, $\theta_{BDC}$, is equal to $\theta_{TDC}+180°$. In actual practice, however, factors such as wrist pin offset, etc. are such that $\theta$ is slightly displaced from $\theta TDC+180°$. This displacement can be calculated from engine design parameters. When $\theta BDC$ has been identified, a corresponding (average) $P_{BDC}$ is obtained, $V_{BDC}$ is determined from the equation:

$$V_{BDC} = \left[\frac{k}{P_{BDC}}\right]^{\frac{1}{\gamma}} \quad (15)$$

Compression ratio may then be obtained as:

$$C/R = \frac{V_{TDC}+V_{DP}}{V_{TDC}} = \frac{V_{TDC}+(V_{BDC}-V_{TDC})}{V_{TDC}} \quad (16)$$

$$= \frac{V_{BDC}}{V_{TDC}}$$

Comparison of the compression ratio measurement made as described above with a measurement obtained as previously described may be used to detect engine faults or compression ratio measurement error caused, for example, by unsealed piston rings.

It is also possible, within the scope of the invention, to instrument two different cylinders for microwave and pressure measurement, or indeed to instrument all cylinders for pressure but only one cylinder for microwave where compression ratio, clearance volume, $\gamma$ or $k$ are to be measured at all cylinders, for example. In these cases, $\theta_{TDC}$ for each cylinder would be determined by adding an appropriate angular increment to the $\theta_{TDC}$ measured for the microwave-instrumented cylinder. In a similar manner, two different cylinders could be instrumented for microwave and pressure measurements when the use of specialized pressure transducers, such as a flush-mounted pressure transducer, is desirable. Such flush-mounting may improve accuracy in the measurement of pressure variations, and thus overall accuracy of cylinder parameter measurement, under some conditions.

Thus, the method of the invention to the extent thus far described contemplates identification of crankangle $\theta_{TDC}$ at piston top dead center. Most preferably, this is accomplished using the microwave techniques disclosed in the referenced Wilson patent. $P_a, P_b, P_c$ are measured at predetermined angles $\theta_a$, $\theta_b$ and $\theta_c$ incrementally spaced from $\theta_{TDC}$. Cylinder pressure $P_{TDC}$ is then measured at the TDC crankangle $\theta_{TDC}$. (One of the positions $\theta_a$, $\theta_b$ or $\theta_c$ may be $\theta_{TDC}$.) Most preferably, these incremental angles are equal, and the pressure measurements are taken when all valves are closed during the piston compression stroke. Incremental displacement volumes $V_{a\text{-}b}$ and $V_{b\text{-}c}$ are calculated or, more preferably, precalculated for the type of engine under test from nominal engine design parameters.

With the pressure readings $P_a, P_b, P_c$ and the displacement volumes $V_{a\text{-}b}, V_{b\text{-}c}$ in hand, equation (1) may be expressed in the form of three equations, which may then be solved for the two unknown constants $\gamma$ and $k$, and also for the initial 'reference' volume $V_a$, which may be $V_{TDC}$. Where $V_a$ is not $V_{TDC}$, and knowing $\gamma$ and $k$ for the cylinder under test, clearance volume $V_{TDC}$ may be determined using equation (1) and $P_{TDC}$. A second technique for identifying the unknowns $\gamma$, $k$ and $V_a$ is an iterative "graphic" solution of two dimensions to locate the point of "graphic" intersection. This point of intersection corresponds to the actual solution, and yields the desired unknowns. Most preferably, either technique is employed in real time using a suitably programmed conventional digital microprocessor.

Thus, one aspect of the method of the invention contemplates measurement of $\gamma$, $k$ or clearance volume $V_{TDC}$ as previously described. Another aspect of the method contemplates determination of compression ratio (C/R) for the cylinder under test as a function of the fraction $(V_{TDC}+V_{DP})/V_{TDC}$ where VDP is total piston displacement volume. Total displacement volume is obtained either as a calculated or precalculated function of engine design parameters, or by measuring the volume $V_{BDC}$ at piston bottom dead center if all valves are closed, in accordance with equation (15).

Probes conventionally employed for measuring cylinder pressure provide what may be envisioned as the varying or differential portion of the pressure signal. In applying the specific techniques heretofore discussed, this varying pressure signal must be added to a reference level to obtain an absolute pressure measurement $P_a, P_b$, etc. See Lancaster et al, "Measurement and Analysis of Engine Pressure Data", *SAE Paper* No. 750026 (1975) at page 5 or Brown, "Methods for Evaluating Requirements and Errors in Cylinder Pressure Measurement" *SAE Paper* No. 670008 (1967) at pages 66–67. Regardless of whether a given probe provides differential or absolute pressure measurements, the principles of the invention hereinbefore discussed may be implemented equally as well by employing only the pressure differential portion of the signal and discarding any absolute pressure information, thereby avoiding the need to measure a reference level or rely upon a precalibrated indication of reference level. More specifically, all absolute pressure measurements may be envisioned as the sum of an unknown reference level $P_o$ and a differential pressure $\Delta P_n$, which may be the difference between the sinusoidal probe pressure signal at angle $\theta_n$ and the pressure signal at BDC following the intake stroke, for example. Pressure measurements are taken at four points $\theta_a$, $\theta_b$, $\theta_c$, $\theta_d$, yielding four pressure differential signals $\Delta P_a$, $\Delta P_b$, $\Delta P_c$ and $\Delta P_d$. Using equation (1) to establish four independent equations analogous to equations (2) through (4), each of the unknowns $\gamma$, k, $V_1$ and $P_o$ may be obtained employing either mathematical or iterative techniques analogous to those previously discussed.

It will be appreciated from the graph 82 in FIG. 5 that resolution of pressure versus crank angle is at a minimum at TDC. Moreover, as previously noted, the dynamics of gas behavior at or near TDC may cause cylinder behavior to depart somewhat from theoretical equation (1). Cylinder leakage, if any, would normally maximize around TDC. To overcome these and other difficulties, another important modification to the implementations of the invention heretofore discussed obtains improved accuracy by measurin $V_{TDC}$ without measurin $P_{TDC}$.

Figure 7:
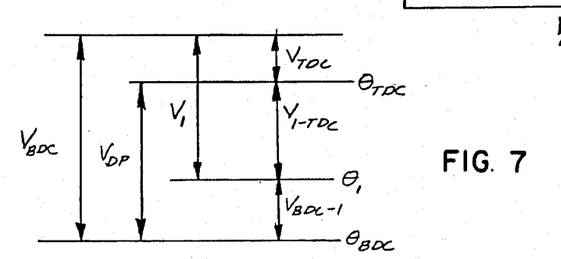

FIG. 7 is a graphic illustration (not to scale) which relates piston volume V to various crank angles $\theta_n$ and complements FIG. 5 heretofore discussed. Volume $V_1$ is first determined per the previous discussions by measuring pressures $P_1$, $P_2$, $P_3$ at angles $\theta_1$, $\theta_2$, $\theta_3$, determining differential volumes $V_{1-2}$ and $V_{2-3}$ from engine design geometry, and mathematically implementing equations (2)–(4) or iteratively implementing equations (5)–(7). Instead of employing equation (9) to find $V_{TDC}$ from $P_{TDC}$, however, engine design geometry is again referenced to find differential volume $V_{1-TDC}$ between crank angles $\theta_1$ and $\theta_{TDC}$. Volume $V_{TDC}$ is then found as:

$$V_{TDC} = V_1 - V_{1-TDC} \quad (17)$$

Constants k and $\gamma$ may be determined as before. In addition to avoiding difficulties associated with measuring $P_{TDC}$, this aspect of the invention permits $V_{TDC}$ to be measured during actual engine operation, where $P_{TDC}$ would be greatly affected by combustion, by obtaining all necessary pressure data well ahead of TDC before combustion is initiated.

The foregoing aspect of the invention leads to yet another application for measuring or quantifying cylinder leakage during the compression stroke. That is, clearance volume $V_{TDC}$ and constants $\gamma$ and k are first determined using the method set forth immediately above which does not require measurement of $P_{TDC}$. A theoretical or predicted pressure at TDC is then identified as a function of the equation:

$$P'_{TDC} = \frac{k}{V^\gamma_{TDC}} \quad (18)$$

Actual cylinder pressure $P_{TDC}$ is then measured at $\theta_{TDC}$, and may be averaged over several cycles. The difference $P'_{TDC} - P_{TDC}$ is thus a measure of pressure leakage, which may be due to improperly installed or defective piston rings, etc. It will be appreciated, of course, that this method of quantifying cylinder leakage is best carried out while cold motoring the engine. However, the principle of this method may also be applied during actual engine operation. Evaluation of predicted versus actual pressure is performed at a crankshaft position somewhat prior to start of combustion. Cylinder volume at this crankshaft position is determined as a function of volume $V_1$ from equation (17) and engine design parameters. Regardless of which crankshaft position is used, pressure readings for determination of cylinder volume, k and $\gamma$ are taken at an early portion of the compression cycle after the intake valve has closed but before substantial compression (and possible leakage) has taken place.

Yet another application of the invention contemplates determination of the effective or equivalent angle of valve operation—i.e. the crankshaft angle during the intake/compression cycle at which the intake valve closes, and/or the crank angle during the power/exhaust cycle at which the exhaust valve opens. Simply stated, this is accomplished by first determining k, $\gamma$ and $V_{TDC}$ per any of the foregoing techniques. Due to potential heat loss from the compressed gas to the surrounding structure, k and $\gamma$ are computed for the compression stroke and recomputed for the power stroke. (Of course, all pressure readings for determining Y, k and $V_{TDC}$ must be taken at crank angles where all valves are known to be closed.) $V_{TDC}$ and engine design geometry yield volume as a function of crank angle - i.e., $V(\theta)$. Pressure readings are then taken (during cold motoring) through the intake/compression and power/exhaust cycles, and are compared with predicted pressures per equation (1) and $V(\theta)$ to locate those angles $\theta_V$ at which equation (1) is no longer valid, which means that the cylinder is no longer a "closed" cylinder. During the power/exhaust cycle, this angle $\theta_V$ is the effective angle of exhaust valve opening. During the intake/compression cycle, this angle is the effective angle of intake valve closure.

Most conventionally, compression ratio is defined per equation (16) as a simple volume ratio. However, in much of the literature on two-stroke engines, compression ratio is defined with reference to cylinder volume at intake port closure rather than $V_{BDC}$ in an attempt to accommodate substantial piston "compression" travel with the intake port open. See Taylor, *The Internal-Combustion Engine in Theory and Practice*, MIT Press, 2nd Ed. (1966), Vol. 1, p. 216. The same may be said for specialized four stroke engines wherein the intake valve remains open well after BDC. For such engines, effective compression ratio can be determined in accordance with yet another implementation of the invention.

Applying equations (1) and (16), compression ratio C/R can be expressed as:

$$C/R = \left[ \frac{P_{TDC}}{P_{BDC}} \right]^{\frac{1}{\gamma}} \quad (19)$$

However, in those applications where the angle $\theta_V$ of intake valve closure is well after BDC, effective compression ratio C/R' may be defined as:

$$C/R' = \frac{V_{\theta V}}{V_{TDC}} \quad (20)$$

or $$C/R' = \left[ \frac{P_{TDC}}{P_{\theta V}} \right]^{\frac{1}{\gamma}} \quad (21)$$

Thus, after determining $\gamma$, k and $\theta_V$ per the foregoing discussion, volumes $V_{\theta V}$ and $V_{TDC}$ may be identified and effective compression ratio C/R' identified per equation (20), or pressures $P_{TDC}$ and $P_{\theta V}$ may be measured at TDC and $\theta_V$ respectively and effective compression ratio C/R determined per equation (21).

An analogous application of the invention to that discussed immediately above contemplates determination of effective intake pressure. This aspect of the invention finds particular utility with respect to supercharged engines where a compressor or the like is employed to raise intake pressure above ambient. Solving equation (19) for intake pressure at BDC:

$$P_{BDC} = \left[\frac{1}{C/R}\right]^\gamma P_{TDC} \quad (22)$$

Compression ratio $(V_{BDC}/V_{TDC})$, constant $\gamma$ and pressure $P_{TDC}$ may be determined or measured per the foregoing discussion, and equation (22) then solved for effective intake pressure. Alternatively, equation (22) may be expressed as:

$$P_{\theta V} = \left[\frac{V_a}{V_{\theta V}}\right]^\gamma P_a \quad (23)$$

where pressure $P_a$ and volume $V_a$ correspond to crankangle $\theta_a$, and volume $V_{\theta V}$ to measured or nominal intake valve closure angle $\theta_V$.

The invention is applicable to the various aspects of engine research, design, production, diagnosis, operation and control. For example, in the production of engine heads, this invention may be employed to measure the volumes of the cavities that correspond to the individual cylinders. The engine head, with valve and spark plug holes sealed, may be affixed temporarily to a permanent fixture that resembles a cold motored engine without a head. This fixture may be constructed so as to allow adequate cylinder height for incorporation of a valve and a pressure sensor for each cylinder. During motoring of the reciprocating pistons within the cylinders of the fixture, the volumes of the individual cavities can be derived by use of the invention as described hereinabove. Machining operations may then be employed to modify these cavity volumes, if required. Another example of the application of the invention is found in the field of engine operation and control. In this application, the engine may be instrumented so as to provide continuous information about crankshaft position. Each cylinder may be instrumented with a pressure sensor, such as that described in Randall and Powell, "A Cylinder Pressure Sensor for Spark Advance Control and Knock Detection", SAE Paper No. 790139 (1979). The invention may then be employed to monitor such factors as cylinder volume change caused by either engine component wear or the accumulation of carbon deposits, and cylinder leakage caused, for example, by engine component wear. Information gained in this manner can be used by the engine control system to further optimize engine operation.

The invention also contemplates apparatus for determining cylinder thermodynamic constants k and $\gamma$, cylinder clearance volume, compression ratio, cylinder leakage, valve operation, effective compression ratio and/or effective intake pressure in accordance with the foregoing method, including in particular a dual microwave/pressure probe adapted to communicate with the cylinder bore.

The invention claimed is:

1. A method of measuring clearance volume $V_{TDC}$ wi the cylinder of an internal combustion engine having a piston disposed to reciprocate in said cylinder and a crankshaft coupled to said piston, said method comprising the steps of:
   (a) monitoring angular rotation of said crankshaft,
   (b) identifying an angular position $\theta_{TDC}$ of said crankshaft corresponding to top dead center of said piston within said cylinder,
   (c) measuring cylinder pressures $P_a$, $P_b$, $P_c$ at angularly spaced positions $\theta_a$, $\theta_b$, $\theta_c$ of said crankshaft different from said top dead center position $\theta_{TDC}$,
   (d) identifying volumes $V_{a\text{-}b}$, $V_{b\text{-}c}$ and $V_{a\text{-}TDC}$ of piston displacement between crankshaft positions $\theta_a$, $\theta_b$, $\theta_c$ and $\theta_a$, $\theta_{TDC}$ respectively, and
   (e) determining at least clearance volume $V_{TDC}$ as a function of the following four equations involving the four unknowns $V_a$, $V_{TDC}$, $\gamma$ and k:
   $$P_a V_a^\gamma = k$$
   $$P_b (V_a + V_{a\text{-}b})^\gamma = k$$
   $$P_c (V_a + V_{a\text{-}b} + V_{b\text{-}c})^\gamma = k$$
   (f) determining said clearance volume as a function
   $$V_{TDC} = V_a - V_{a\text{-}TDC}.$$

2. The method set forth in claim 1 wherein said step (c) is carried out during the compression power stroke of said piston within said cylinder, wherein said step (e) includes the step of determining the constants $\gamma$ and k as a function of said three equations, and wherein said method includes the additional steps of:
   (f) identifying a predicted pressure $P'_{TDC}$ at said piston top dead center position as a function of the equation:
   $$P'_{TDC} = \left[\frac{k}{V^\gamma_{TDC}}\right]$$
   (g) measuring cylinder pressure $P_{TDC}$ at said top dead center position, and
   (h) quantifying cylinder leakage during said compression/power stroke as a function of a difference between $P'_{TDC}$ and $P_{TDC}$.

3. A method of measuring angle of valve operation within the cylinder of an internal combustion engine having a piston disposed to reciprocate within said cylinder and a crankshaft rotatably coupled to said piston, cylinder pressure and volume being related to each other with all valves closed by the equation $PV^\gamma = k$ wherein P is pressure, V is volume and $\gamma$ and k are constants, said method comprising the steps of:
   (a) monitoring angular rotation of said crankshaft,
   (b) identifying an angular position $\theta_{TDC}$ of said crankshaft corresponding to top dead center of said piston within said cylinder,
   (c) measuring pressure within said cylinder at a multiplicity of angularly spaced positions of said crankshaft while said crankshaft is rotating and said piston is reciprocating within said cylinder,
   (d) identifying displacement volumes of said piston within said cylinder between at least some of said angularly spaced positions at which said valve is known to be closed, (e) determining said constants $\gamma$ and k as a function of said displacement volumes and said measured pressures,
(f) comparing said measured pressures at the remainder of said angularly spaced positions to pressures P predicted by said equation, and
(g) identifying angle $\theta_V$ of valve operation with respect to $\theta_{TDC}$ as a function of a difference between said predicted pressure and said measured pressure for each said angularly spaced position.

4. The method set forth in claim 3 wherein said valve is an intake valve, wherein said step (c) includes the step of measuring pressure $P_{TDC}$ at said angle $\theta_{TDC}$, and wherein said method comprises the additional step of:
(h) determining compression ratio C/R of said cylinder as a function of the equation:

$$C/R = \left[\frac{P_{TDC}}{P_{\theta V}}\right]^{\frac{1}{\gamma}}$$

wherein $P_{\theta V}$ is pressure measured in said step (c) at said angle $\theta_V$ identified in said step (g).

5. The method set forth in claim 3 wherein said valve comprises a cylinder intake valve, and wherein said method comprises the additional steps of:
(h) determining clearance volume $V_{TDC}$ within said cylinder as a function of said measured pressures, said displacement volumes and said equation,
(i) determining volume $V_{\theta V}$ within said cylinder at said angle $\theta_V$ per said step (g) as a function of said displacement volumes and said equation, and
(j) determining compression ratio C/R of said cylinder as a function of the equation $$C/R = \frac{V_{\theta V}}{V_{TDC}}.$$

6. The method set forth in claim 3 wherein said step (c) comprises the step of measuring cylinder pressure $P_{TDC}$ at said angle $\theta_{TDC}$, and wherein said method comprises the additional steps of:
(h) determining compression ratio C/R as a function of said pressures measured in said step (c), said displacement volumes identified in said step (d) and said equation, and
(i) determining cylinder intake pressure $P_{\theta V}$ at said angle $\theta_V$ identified in said step (g) as a function of the equation:

$$P_{\theta V} = \left[\frac{1}{C/R}\right]^{\gamma} P_{TDC}.$$

7. Apparatus for measuring clearance volume within the cylinder of an internal combustion engine having a piston disposed to reciprocate in said cylinder and a crankshaft coupled to said piston, said apparatus comprising
means for monitoring angular rotation of said crankshaft,
means for measuring cylinder pressures at a multiplicity of angularly spaced positions of said crankshaft other than top dead center position of said piston within said cylinder,
means for identifying volumes of piston displacement between said angularly spaced crankshaft positions, and
means for determining clearance volume $V_{TDC}$ as a function of said displacement volumes and said cylinder pressures.

8. Apparatus as set forth in claim 7 further comprising:
means for identifying a predicted pressure $P'_{TDC}$ at said piston top dead center position as a function of said displacement volumes and said cylinder pressures,
means for identifying an angular position $\theta_{TDC}$ of said crankshaft corresponding to top dead cente piston within said cylinder,
means for measuring cylinder pressure $P_{TDC}$ at said top dead center position, and
means for quantifying cylinder leakage as a function of a difference between $P'_{TDC}$ and $P_{TDC}$.

9. Apparatus for measuring angle of valve operation within the cylinder of an internal combustion engine having a piston disposed to reciprocate within said cylinder and a crankshaft rotatably coupled to said piston, cylinder pressure and volume being related to each other with all valves closed by the equation $PV^{\gamma} = k$ wherein P is pressure, V is volume and $\gamma$ and k are constants, said apparatus comprising
means for monitoring angular rotation of said crankshaft,
means for identifying an angular position $\theta_{TDC}$ of said crankshaft corresponding to top dead center of said piston within said cylinder,
means for measuring pressure within said cylinder at a multiplicity of angularly spaced positions of said crankshaft while said crankshaft is rotating and said piston is reciprocating within said cylinder,
means for identifying displacement volumes of said piston within said cylinder between at least some of said angularly spaced positions at which said valve is known to be closed,
means for determining said constants $\gamma$ and k as a function of said displacement volumes and said measured pressures,
means for comparing said measured pressures at the remainder of said angularly spaced positions to pressures P at said positions predicted by said equation, and
means for identifying angle $\theta_V$ of valve operation with respect to $\theta_{TDC}$ as a function of a difference between said angularly spaced position.

10. A method of quantifying leakage within the cylinder of an internal combustion engine having a piston disposed to reciprocate in said cylinder and a crankshaft coupled to said piston, said method comprising the steps of:
(a) monitoring angular rotation of said crankshaft,
(b) identifying an angular positio $\theta_{TDC}$ of said crankshaft corresponding to top dead center of said piston within said cylinder,
(c) measuring during the compression/power stroke of said piston cylinder pressures $P_a$, $P_b$, $P_c$ at angularly spaced positions $\theta_a$, $\theta_b$, $\theta_c$ of said crankshaft different from said top dead center position $\theta_{TDC}$,
(d) measuring cylinder pressure $P_d$ at angular position $\theta_d$ at preselected relationship to said angular position $\theta_{TDC}$, (e) identifying volumes $V_{a\text{-}b}$, $V_{b\text{-}c}$ and $V_{a\text{-}d}$ of piston displacement between crankshaft positions $\theta_a$, $\theta_b$, $\theta_c$ and $\theta_d$ respectively, (f) determining the four unknowns $V_a$, $V_d$, $\gamma$ and k as a function of the following four equations:
$$P_a V_a^\gamma = k$$
$$P_b (V_a + V_{a\text{-}b})^\gamma = k$$
$$P_c (V_a + V_{a\text{-}b} + V_{b\text{-}c})^\gamma = k$$
$$V_d = V_{a\text{-}d}$$

(g) identifying a predicted pressure $P'_d$ at said crankshaft position $\theta_d$ as a function of the equation:

$$P'_d = \frac{k}{V_d^\gamma}$$

and then (h) quantifying cylinder leakage during said compression/power stroke as a function of a difference between $P'_d$ and $P_d$.

11. A method of measuring angle of valve operation within the cylinder of an internal combustion engine having a piston disposed to reciprocate within said cylinder and a crankshaft rotatably coupled to said piston, cylinder pressure and volume being related to each other with all valves closed by the equation $PV^\gamma = k$ wherein P is pressure, V is volume and $\gamma$ and k are constants, said method comprising the steps of:

(a) monitoring angular rotation of said crankshaft, (b) identifying an angular position $\theta_{TDC}$ of said crankshaft corresponding to top dead center of said piston within said cylinder, (c) measuring pressure within said cylinder at a multiplicity of angularly spaced positions of said crankshaft while said crankshaft is rotating and said piston is reciprocating within said cylinder, (d) identifying displacement volumes of said piston within said cylinder between at least some of said angularly spaced positions at which all said valves are known to be closed, (e) determining a volume $V_1$ for at least one of said angularly spaced positions and said constants $\gamma$ and k as a function of said displacement volumes and said measured pressures, (f) determining said volume V for each of the remainder of said angularly spaced positions as a function of said volume $V_1$ and engine design parameters, (g) comparing said measured pressures at said remainder of said angularly spaced positions to pressures P predicted by said equation, and (h) identifying angle $\theta_V$ of valve operation with respect to $\theta_{TDC}$ as a function of a difference between said predicted pressure and said measured pressure for each said angularly spaced position.

12. The method set forth in claim 11 wherein said valve comprises a cylinder intake valve, and wherein said method comprises the additional steps of:

(i) determining clearance volume $V_{TDC}$ within said cylinder as a function of said measured pressures, said displacement volumes and said equation, (j) identify from step (f) the volume $V_{\theta V}$ within said cylinder at said angle $\theta_V$ per said step (h), and (k) determining compression ratio C/R of said cylinder as a function of the equation $$C/R = \frac{V_{\theta V}}{V_{TDC}}.$$

13. A method of measuring intake pressure $P_{\theta V}$ within the cylinder of an internal combustion engine having a piston disposed to reciprocate in said cylinder and a crankshaft coupled to said piston, said method comprising the steps of:

(a) monitoring angular rotation of said crankshaft, (b) identifying an angular position $\theta_{TDC}$ of said crankshaft corresponding to top dead center of said piston within said cylinder, (c) measuring cylinder pressure $P_a$, $P_b$, $P_c$, $P_{TDC}$ at angularly spaced positions $\theta_a$, $\theta_b$, $\theta_c$, $\theta_{TDC}$ of said crankshaft, (d) identifying volumes $V_{a\text{-}b}$ and $V_{b\text{-}c}$ of piston displacement between crankshaft positions $\theta_a$, $\theta_b$, $\theta_c$, (e) determining at least cylinder parameter $\gamma$ as a function of the following three equations involving the three unknowns $V_a$, $\gamma$ and k:

$$P_a V_a^\gamma = k$$

$$P_b (V_a + V_{a\text{-}b})^\gamma = k$$

$$P_c (V_a + V_{a\text{-}b} + V_{b\text{-}c})^\gamma = k$$

(f) identifying engine cylinder compression ratio C/R, and (g) determining cylinder intake pressure $P_{\theta V}$ as a function of the equation:

$$P_{\theta V} = \left[\frac{1}{C/R}\right]^\gamma P_{TDC}.$$

14. A method of measuring intake pressure $P_{\theta V}$ within the cylinder of an internal combustion engine having a piston disposed to reciprocate in said cylinder and a crankshaft coupled to said piston, said method comprising the steps of:

(a) monitoring angular rotation of said crankshaft, (b) measuring cylinder pressure $P_a$, $P_b$, $P_c$ at angularly spaced positions $\theta_a$, $\theta_b$, $\theta_c$ of said crankshaft, (c) identifying volumes $V_{a\text{-}b}$ and $V_{b\text{-}c}$ of piston displacement between crankshaft positions $\theta_a$, $\theta_b$, $\theta_c$, (d) determining at least volume $V_a$ and cylinder parameter $\gamma$ as a function of the following three equations involving the three unknowns $V_a$, $\gamma$ and k:

$$P_a V_a^\gamma = k$$

$$P_b (V_a + V_{a\text{-}b})^\gamma = k$$

$$P_c (V_a + V_{a\text{-}b} + V_{b\text{-}c})^\gamma = k$$

(e) identifying a volume $V_{\theta V}$ of said cylinder corresponding to intake valve closure, and (f) determining cylinder intake pressure $P_{\theta V}$ as a function of the equation:

$$P_{\theta V} = \left[\frac{V_a}{V_{\theta V}}\right]^\gamma P_a.$$

15. A method of quantifying leakage from a cylinder of an internal combustion engine having a piston disposed to reciprocate within said cylinder and a crankshaft rotatably coupled to said piston, said method comprising the steps of:
  (a) monitoring rotation of said crankshaft,
  (b) monitoring pressure within said cylinder while said crankshaft is rotating and said piston is reciprocating within said cylinder,
  (c) identifying displacement volumes of said piston within said cylinder as a function of rotation of said crankshaft, and
  (d) quantifying leakage from said cylinder as a function of monitored pressure and identified displacement volumes.

16. The method set forth in claim 15 comprising the additional step (e) prior to said step (d) of determining total volume within said cylinder at at least one position of said crankshaft as a function of said monitored pressure and said identified displacement volumes, and wherein said step (d) comprises the step of quantifying said leakage as a function of said total volume.

17. The method set forth in claim 16 wherein at least one of said steps (e) and (d) is carried out as a function of the polytropic equation $PV^\gamma = k$ as a model of the pressur-volume relationship within said cylinder, where P is pressure, V is volume and $\gamma$ and k are constants.

18. The method set forth in claim 15 wherein said step (d) is carried out as a function of the polytropic equation $PV^\gamma = k$ as a model of the pressure-volume relationship within said cylinder, where P is pressure, V is volume and $\gamma$ and k are constants.

19. The method set forth in claim 18 wherein said step (d) includes the steps of:
  (d1) establishing for a first selected crankshaft position a value of at least one of the parameters P, V, $\gamma$ and k,
  (d2) establishing for a second selected crankshaft position a value of at least one of the parameters P, V, $\gamma$ and k,
  (d3) predicting for said second selected crankshaft position a predicted value of at least one of the parameters P, V, $\gamma$ and k as a function of both said polytropic equation and at least one of said established values at said first selected angular position, and
  (d4) quantifying leakage from said cylinder as a function of a difference between said established value for said second selected crankshaft position and said predicted value for said second selected crankshaft position.

20. The method set forth in claim 19 wherein at least one of said steps (d1) and (d2) includes the steps of:
  (e) measuring pressures $P_a$, $P_b$, $P_c$ at angularly spaced positions $\theta_a$, $\theta_b$, $\theta_c$ of said crankshaft,
  (f) identifying displacement volumes $V_{a-b}$ and $V_{b-c}$ of piston displacement between said crankshaft positions $\theta_a$, $\theta_b$, $\theta_c$ respectively, and
  (g) determining at least one of the parameters $V_a$, $\gamma$ and k as a function of the equations:
  $$P_a V_a^\gamma = k$$
  $$P_b (V_a + V_{a-b})^\gamma = k$$
  $$P_c(P_c (V_a + V_{a-b} + V_{b-c})^\gamma = k$$

21. The method set forth in claim 10, 15 or 20 comprising the additional step of cold motoring said engine from a source external to said engine.

22. The method set forth in claim 15 or 20 wherein all of said pressures are measured during the compression/power stroke of said piston within said cylinder.

23. The method set forth in claim 22 wherein all of said pressures are measured during the compression stroke.

24. Apparatus for quantifying leakage from a cylinder having a piston disposed to reciprocate therein and a shaft rotatably coupled to said piston, said apparatus comprising,
  means for measuring pressure within said cylinder at a of spaced positions of said piston within said cylinder while said piston reciprocates within said cylinder,
  means for determining displacement volumes of said piston within said cylinder between said plurality of spaced positions, and
  means for quantifying leakage from said cylinder as a function of measured pressure and said displacement volumes.

25. The apparatus set forth in claim 24 wherein said means for quantifying leakage from said cylinder includes means for quantifying said leakage as a function of the polytropic equation $PV^\gamma = k$ as a model of the pressure-volume relationship within said cylinder, where P is pressure, V is volume and k and $\gamma$ are.constants.

26. The apparatus set forth in claim 24 or 25 wherein said means for measuring pressure within said cylinder comprises means for monitoring angular rotation of said shaft rotatably coupled to said piston.

* * * * *